United States Patent [19]
Wilkinson et al.

[11] 4,051,277
[45] Sept. 27, 1977

[54] RIGID-WHEN-WET PAPERBOARD CONTAINERS AND THEIR MANUFACTURE

[75] Inventors: Robert M. Wilkinson, Florissant, Mo.; James R. Lyon, Godfrey, Ill.

[73] Assignee: Alton Box Board Company, Alton, Ill.

[21] Appl. No.: 567,639

[22] Filed: Apr. 14, 1975

Related U.S. Application Data

[60] Division of Ser. No. 277,646, Aug. 3, 1972, Pat. No. 3,886,019, which is a continuation-in-part of Ser. No. 39,086, May 20, 1970, abandoned.

[51] Int. Cl.[2] .......... B31F 1/20; C09J 5/02; B32B 3/28; B32B 29/00

[52] U.S. Cl. .......... 427/288; 101/170; 156/210; 156/307; 156/470; 427/361; 427/391; 427/428

[58] Field of Search .......... 156/210, 307, 470, 205; 427/391, 288, 361, 428; 428/531, 182, 524, 530; 118/212; 101/170

[56] References Cited

U.S. PATENT DOCUMENTS

| | | | |
|---|---|---|---|
| 2,827,873 | 3/1958 | Thorn | 118/7 |
| 3,265,550 | 8/1966 | Lindquist | 156/210 |
| 3,300,359 | 1/1967 | Nikkel | 118/212 X |
| 3,313,270 | 4/1967 | LaBombarde et al. | 118/212 X |
| 3,697,365 | 10/1972 | Reisman et al. | 156/210 X |

*Primary Examiner*—Michael R. Lusignan
*Attorney, Agent, or Firm*—Paul M. Denk

[57] ABSTRACT

Rigid-when-wet, but foldable, corrugated paperboard and process of making same by applying phenolic resin to contiguous surfaces of the outer liner, the medium, and the inner liner without substantially altering the hygroscopicity of the exposed faces of the liners, and adhering the three components together before the resin is cured.

5 Claims, 11 Drawing Figures

RIGID-WHEN-WET PAPERBOARD CONTAINERS AND THEIR MANUFACTURE

CROSS REFERENCE TO RELATED APPLICATION

This application comprises a division of the application of Robert M. Wilkinson and James R. Lyon, Ser. No. 277,646 filed Aug. 3, 1972 now U.S. Pat. No. 3,886,019, issuing on May 27, 1975, which patent comprises a continuation-in-part of the application of the same inventors having Ser. No. 39,086, filed on May 20, 1970, and now abandoned, priority being claimed with respect to all common subject matter in both said applications.

BACKGROUND OF THE INVENTION

The invention relates to corrugated paperboard and shipping containers made therefrom.

In the preparation for market, transportation and storage of perishable comestibles such as vegetables, fruit and seafood, both the produce and the container are exposed to much water in one or all of the liquid, solid or vapor states. Such conditions have militated against the use, for that purpose, of containers made of paperboard.

In the marketing of fresh corn, lettuce, celery, peaches, and the like, the prevailing practice is to pack produce into its shipping container, in or near the field in which the produce is picked; and immediately thereafter to immerse the containers and contents in cold water to remove the field heat from them as quickly as possible. Thereafter, the packages are stacked, several high, in transportation vehicles or in cold storage chambers. The transportation vehicles are frequently refrigerated by ice, frequently in the form of flakes, charged into the body of the vehicle over and around the stacked packages of produce. Ice melts. In the course of the journey, depending upon its length and weather conditions, the shipment may be re-iced one or more times. Apples present a different aspect of the same problem. Apples are harvested in the autumn, but consumers expect to be able to buy them in other seasons. Apples are cold stored under high humidity conditions, e.g., 90% relative humidity, in boxes stacked ten to twnenty feet high for months.

Ordinary corrugated paperboard containers lose their stiffness when wet. The collapse under the conditions described in the last paragraph. Damage to the packaged produce results. The higher the containers are stacked upon each other, the greater the load on the bottom one of the stack, and the greater the likelihood of collapse in the lower ones with resultant tendency of the stack to topple.

The problem is not a new one. It was referred to in U.S. Pat. No. 1,592,824 as follows:

> "The use of boxes made of corrugated straw board has, up to the present time, been limied to uses where boxes and their contents are not subjected to moisture and becomes inefficient when wet or damp. For example, corrugated board boxes containing goods have not been kept in cold storage warehouses, because the moisture would cause the corrugated board to disintegrate under pressure of stresses and thus destroy the efficiency of the box as a container. A desideratum in this art has been to provide a corrugated board container which was made of faced corrugated straw board in usual manner and which would not be rendered incapable of performing its function when subjected to moisture."
>
> "The primary object of the present invention is to produce an improved corrugated board which has been treated, after the board has been manufactured, with a water-proofing compound, so that it will not absorb moisture." (Col. 1, LL. 10–34)

It was further discussed in an article by D. J. Fahey entitled "Use Of Chemical Comounds To Improve The Stiffness Of Container Board At High Moisture Conditions", which appeared in Tappi, issue of September 1962, where data are tabulated concerning the physical properties of "Wet-Strength" paperboard sheets, of the kind used as components ("liner" and "medium") of corrugated container-board, to which various resins had been added at different stages (pulp slurry, size press, or smoothing press) of the paper-making process. Fahey concluded:

> "Certain chemicals can be used effectively to improve the compressive strength of paperboard at high humidities, with the phenolic resins being one of the more promising. The improvement is dependent upon the amount of the resin present in the board, the nature of the resin, and the way in which it is distributed in the board. Embrittlement of the board is one of the results of the treatment, but this is minimized with small levels of treatment. For the most efficient use of a specific amount of resin, surface treatments are more desirable than thorough impregnation of the board. Results point toward a skin effect on the board which may be achieved with treating mixtures of higher viscosity. Many chemicals that are not too effective at high moisture are highly effective at low moistures.
>
> "While the work to date shows some measure of success, further research is needed to achieve a board that will maintain its stiffness over the entire moisture range."

Comparable date on similarly treated paperboard are reported in U.S. Forrest Service Research Note PPL-084, , December 1964, with the following conclusion:

> "Compressive strength of linerboard exposed to high moisture conditions can be improved by treatments with water-soluble phenolic resins. The low-molecular-weight type resins gave the higher compressive strength, but these also cause more embrittlement of the board than the medium-condensed phenolic resins."

Another article entitled "Phenolic Resin Treatment Improves Fiberboard Compressive Strength" appeared in the October 1965, issue of Package Engineering, and reported:

> "The use of phenolic resins for improving the wet compressive strength of paper is not new. However, one reason it has not been widely used in containers in that paperboard containing polymerized phenolic resin often becomes brittle. Obviously, a brittle corrugated fiberboard is difficult to score or fold without seriously fracturing the material at the score lines."

It is the primary object of the present invention to provide corrugated paperboard, containers made therefrom, and a process of making the same, which, while providing rigid-when-wet strength sufficient to withstand the rigorous conditions of flooding with water, storage under high humidity, etc., while laden as related above, are not objectionably brittle.

SUMMARY OF THE INVENTION

The present invention is predicated upon the discovery that the teaching of the aforesaid patent was wrong in three respects, to wit: that the corrugated board be treated after it "has been manufactured", that it be treated so that "the outer faces — will not readily absorb moisture", and that the inner faces be "treated with an efficient water-proofing material"; and that the efforts to accomplish the desiderata in the course of the paper mill operations producing "Wet-Strength" paperboard, as reported in the three publications above mentioned, overlooked that the subsequent reeling of the paper had an effect of the same kind as, albeit lesser in degree than, corrugating or folding it.

Accordingly, the present invention contemplates surface-treating that face or faces of the corrugated container-board components (outside liner, medium, and inside liner) which will not be an exposed face (either on the outside or on the inside) of containers made from the composite container-board, but leaving such exposed faces in such condition that they will readily absorb moisture. The surface-treating operation can be, and preferably is, carried out concurrently with the corrugating and laminating operation, but can be carried out in advance of the corrugating and lamination operation if appropriate precautions are taken to prevent or minimize the occurrence, as in the chemically-active surface-treated materials, of substantial change of state while the treated paperboard components await conversion. The surface tretment involves the application of a carefully controlled amount of a curable thermosetting resinous material in a liquid vehicle, such as water, which is removed within a matter of seconds without substantially advancing the cure of the resin. As applied, the solution or emulsion preferably has a fluidity (e.g., viscosity of 18 ± 0.5 seconds in a #2 Zahn cup at 88° F.) approaching that of water (16 seconds), will coat and partially penetrate the surface-treated paperboard component, and, to a limited extent, migrate therewithin; but the invention contemplates that such penetration and migration be arrested before the resin has reached the surface of the board which was not surface-treated. By comparison, the resinous solution having a viscosity of 17.5 seconds in the Zahn cup approximately a twenty-five percent solution by weight, while a 18.5 seconds in the said Zahn cup test approaches a 65 percent solution. The arrest of penetration of the solution is readily achieved by evaporating the vehicle within a matter of seconds after the resinous mixture is deposited upon the surface of the respective components. The resinous material is preferably a phenolic resin of a type which is not hydrophobic, but cures stiff and water insoluble. Depending upon strength and bruise-resistance of the produce to be shipped, one or more of the components can be made of high "wet-strength" paperboard, but for rigid, bruise-resistant produce like watermelons, and some squash, such is not essential. The several surface-treated components are laminated, and adhered together at their surface-treated faces, with an adhesive which is compatible with, and maintains a durable tack with, the resinous material in the presence of water, heat and/or cold. Resorcinol-starch compositions are the presently preferred adhesives. After the surface-treated components have been adhered together, the composite corrugated container-board may be cut, scored and slotted to form blanks for boxes, and the "manufacturer's joint" completed, but as some stage, before the box is packed, the resinous material must be cured, as by exposing it to superambient heat for the requisite period of time, which varies inversely with the curing temperature.

Surface treating of the components of paper-board in the manner as described in this invention furnishes a container-board, the components of which have only a thin film or thickness of curable resin applied to certain surfaces, with very little impregnation, so that rigidity is provided in a container-board which, at the same time, still has its exposed surfaces readily absorptive of moisture, and exhibiting the flexibility normaly provided in such board. Therefore, the blanks or boxes which are formed from the container-board which has been treated in the manner of this invention can still be used and folded in the normal use of such containers, but at the same time, have enhanced rigidity under moisture exposure conditions. But, since in the concept of this invention only discrete surfaces of the components of the container-board have been treated, the containers do not exhibit that friability that exists in other paperboard which has been impregnated or saturated with a resinous composition, and which have a tendency to fracture when exposed to weight, impact, or pressure of any sort.

The same principles are applicable to the manufacture of rigid-when-wet solid fiber container-board.

The mode of applying the resinous material to the paperboard components is important not only from the standpoint of uniformity and quantum, but also from the standpoint of ultimate performance in use, although the reason for the latter has not yet been technologically explained. Superior ultimate performance has been achieved by printing the resinous material onto the surface or surfaces of the respective components, as by a technique known in the printing art as "offset gravure", wherein the fluid material is picked up from a supply by a metallic roll whose surface is engraved or milled to provide miniscule cavities or "cells" which entrap the resinous solution, and after the excess is scraped off the surface, the accurately metered cell contents are transferred to a rubber roll (which is more readily wettable by the resinous material than is the metallic roll), and therefrom to the paperboard (which has greater affinity for the resinous solution than does the rubber roll). Metallic gravure rolls with miniscule cavities or cells engraved or milled into the outer surface therof are commercially available with numerous sizes, and three different shapes, of cells. The shapes and their respective utilities were epitomized in an article entitled "VMA Seminar Studies Coating Rolls" which appeared in the February 1970, issue of Paper Film & Foil Converter, as follows:

> "Roll suppliers generally offer a choice of three different cell shapes: the quadragravure, the pyramid, and the tri-helicoid. As noted, the quad is primarily designed for gravure type of coatings, with viscosities a bit heavier than water. The pyramid is for very aqueous formulations, since the sharp point of the upside-down pyramid retards release of the coating material from the cell. The tri-helicoid is primarily for highly viscous coatings like adhesives and asphalts."

contrary to those criteria, we have discovered that, despite the low viscosity of the aforesaid surface-treating mixture, a superior end product results when a "tri-helicoid" roll is used to apply it, with the "quad" and the "pyramid" next in that order; but we are as yet unable to theoretically explain the phenomenon. In the "tri-helicoid" roll, the cells are miniscule V-shaped grooves formed helically on the surface of the roll so that their length is many times greater than their width or depth. The "quad" and the "pyramid" each have cells which are substantially the same dimension in width as in length, but the "pyramid" is deeper than the "quad" by the degree that the latter is blunted by truncation. Results heretofore achieved indicate that a "tri-helicoid" roll having 54 cells per square inch is to be preferred for surface treating liner board with phenolic resin compositions having a concentration of 50 ± 3% of chemically-active ingredients, and the low viscosity aforesaid, at the rate of 3.6 ± 0.3 pounds of cured phenolic solids per thousand square feet applied on one face only. On the other hand, for the application of the same surface-treating composition to the medium (both sides) at the rate of 1.7 ± 0.2 pounds of cured phenolic solids per thousand square feet per side, it is preferred that a tri-helicoid roll having ninety-five cells per square inch be used, but it will be understood that with other concentrations of chemically-active ingredients, rolls with etching of different size or type may be used according to the criterion that the higher the viscosity, the larger the cell.

The curable thermosetting resinous materials utilized in this invention, of which there are a variety readily available upon the market as described in this application, and any catalyst that may be used in conjunction with the thermosetting phenolic materials, are most effectively and practically entrained in concentration in a vaporizable liquid carrier within the range of between 35 to 63 percent by weight. At these concentrations, the application of the mixture to the components of paperboard as through surface treating provides for deposition and retention of more resinous material proximate the treated surface, and due to the higher concentration of the resin solution, impregnation of the board is significantly reduced.

Within limits, the higher the "wet-strength" of the paperboard components as produced at the mill, the greater will be the rigid-when-wet strength of composite container-board, and of containers made from it, whose components were surface-treated in accordance with the invention. However, the "wet-strength" of the components before surface treatment should not be so great that the medium is fractured in the corrugating operation, or that the liners are fractured by the bends to which they are subjected during surface treatment and/or adhering the medium to them as is done in the conventional mode of manufacture of double-faced corrugated container-board.

Typically, the liners and the corrugating medium, which are to be surface-treated and become components of the ultimate rigid-when-wet corrugated container-board, may have the characteristics enumerated in the following table:

TABLE I

| Type | Caliper (inches) | Weight (pounds per 1,000 sq. ft.) | Wet Strength |
|---|---|---|---|
| | | LINER BOARD | |
| 1 | 0.016-8 | 62 | Yes |
| 2 | 0.018-20 | 69 | No |
| 3 | 0.012-4 | 42 | No |
| 4 | 0.018-20 | 69 | Yes |
| | | CORRUGATING MEDIUM | |
| 5 | 0.011-2 | 36* | Yes |
| 6 | 0.008-9 | 26* | No |
| 7 | 0.011-2 | 36* | No |

TABLE I-continued

| Type | Caliper (inches) | Weight (pounds per 1,000 sq. ft.) | Wet Strength |
|---|---|---|---|
| 8 | 0.010-1 | 33* | Yes |

*To arrive at weight of medium in 1,000 sq. ft. of the composite corrugated container-board, add the appropriate industry standard corrugation take-up based on the flute used, e.g., 54% for A Flute, 33% for B Flute, and 44% for C Flute.

Among the thermosetting phenolic materials which have produced the desired results when applied as hereinbefore described are:

I. One identified herein as "Phenolic X" obtainable from Monsanto Company, the precise chemical composition of which is not now known, but which analysis shows to consist of 25.8% by weight of phenols and 22–27% by weight of formaldehydes, the balance (47 to 53% by weight) water. To make the solution which is applied to the several paperboard components, "Phenolic X" is mixed with water and a catalyst solution identified herein as "Catalyst X", also obtainable from Monsanto Company, the precise chemical composition of which is not known, but which analysis shows to consist of 156.5 grams per liter of ammonium chloride, 400.4 grams per liter of ureas, balance (to make 1000 grams) water and unknowns; and having a pH value of 6.2. The components are preferably mixed in the proportions of 100 pounds of "phenolic X" to 15 pounds of "Catalyst X" plus whatever additional water is required to obtain a viscosity of about 18 seconds in a #2 Zahn cup at 88° F.

II. One disclosed in Example 2 of U.S. Pat. No. 2,245,245 which is cut with water q.s. to make an emulsion having a viscosity of about 18 seconds in a #2 Zahn cup at 88° F.

III. One disclosed in Part A of Example 1 of U.S. Pat. No. 3,161,547 which is cut with water q.s. to the desired viscosity as recited in I and II above.

IV. One known as "Tybond 990" obtainable from Pacific Resins & Chemicals, Inc., which is represented as a phenol-formaldehydewater solution containing 65% solids, and which is cut with water q.s. to achieve the viscosity stated in I and II above.

Other examples of resinous compositions that may be utilized effectively in this invention include the phenol-aldehyde resole resin system as combined with a polyvinyl acetate as identified in U.S. Pat. No. 3,607,598; the phenol-aldehyde resin system as combined with an inorganic ammonium salt and urea as described in U.S. Pat. No. 3,616,163; the aminoplast modified phenol-aldehyde resole resin composition as set forth in U.S. Pat. No. 3,617,427; the resin system described in U.S. Pat. No. 3,617,428; the mixed resin system identified in U.S. Pat. No. 3,617,429; the modified phenol-aldehyde resin system set forth in U.S. Pat. No. 3,619,341; the resin system described in U.S. Pat. No. 3,619,342; the resin system described in the U.S. Pat. No. 3,697,365, entitled Improved Rigid-When-Wet Boxboard, by Abraham J. Reisman and Thomas B. Wilkinson; the resin system described in the U.S. Pat. No. 3,687,767, entitled Scoring Process for Certain Rigid-When-Wet Corrugated Fiber Board, by Abraham J. Reisman and Thomas B. Wilkinson; and the resin system described in the U.S. patent No. 3,682,762, entitled Improved Rigid-When-Wet Boxboard, by John R. LeBlanc; all of the inventions, their U.S. patents or applications, and the invention of this application being owned, jointly, by a common assignee.

The adhesive used to secure the surface-treated faces of the liner components to the crowns of the corrugated medium may be any one which maintains tack with the phenolictreated liners and medium, while wet or dry, hot or cold, and especially must maintain tack under the temperature at which the phenolic resin is cured. Any of a variety of aromatic-alcohol-containing adhesives, especially those which molecularly bond with the phenol under curing conditions, may be used, but most consistent results to date have been achieved with an adhesive mixed at the site of use from constituents obtainable from A. E. Staley Manufacturing Company, and identified, respectively, as "STAY-BIND" 5035, 2100 and 77. 5035 comprises 29% resorcinol and 71% cornstarch having an amylose content of about 55%; 2100 consists of cornstarch having an amylose content of about 55%; and 77 is a "thick boiling" modified cornstarch. The procedure for manufacturing a 650 gallon batch of the adhesive involves: charge a first mixer with 100 gallons of tap water at ambient temperature; add 300 pounds of 5035 and 120 pounds of 77, then agitate until smooth, after which add 30 pounds of caustic soda dissolved in 5 gallons of water, and thereafter heat the mixture to 160° F., maintaining that temperature for ten minutes. Then dilute with 60 gallons of additional water, and agitate for five more minutes. In a separate mixer containing 300 gallons of water at 90° F., add, while the water is being agitated, 280 pounds of 77, 1,000 pounds of 2100, and 128 pounds of formalin (37% formaldehyde solution). Thereafter, slowly add the contents of the first mixer to the second mixer over a period of ten to fifteen minutes, and continue the agitation for one hour, including the time for adding the contents of the first mixer to the second mixer. If a viscosity increase is noted by the end of that hour or thereafter, add tap water in one continuous operation until the batch has reached 650 gallons, while maintaining the temperature between 105° and 110° F.

After having surface-treated one face (i.e., that one which will be concealed in the end product) of each of the two liner webs and both faces of the corrugating medium web, the respective components are dehydrated to the extent of removing from them that amount of water which was introduced with the resinous composition, care being taken that in the removal of such water, the deposited thermosetting resin does not have its cure substantially advanced. After the removal of such water from the respective webs, the medium can be immediately corrugated and adhered to the respective liners in the usual way of making corrugated container-board. Thereafter, the corrugated container-board can be cut into blanks and stored indefinitely under conditions which do not substantially advance the cure of the thermosetting resin) until convenience permits them to be subjected to an approprriate treatment for curing the resin in and on their components; and thereafter quenching the resin, as by spraying them with, or immersing them in, cold water.

For maximum efficiency. The surface treatment of the liners and medium may be carried out as an adjunct to the operation of a conventional machine for the manufacture of corrugated container-board, but it will be understood that, if and when desired, the several components may be separately surface-treated and stored, under conditions which do not substantially advance the cure of the deposited resin, until it is convenient to run them through a corrugating apparatus in the usual way.

Figure 9:
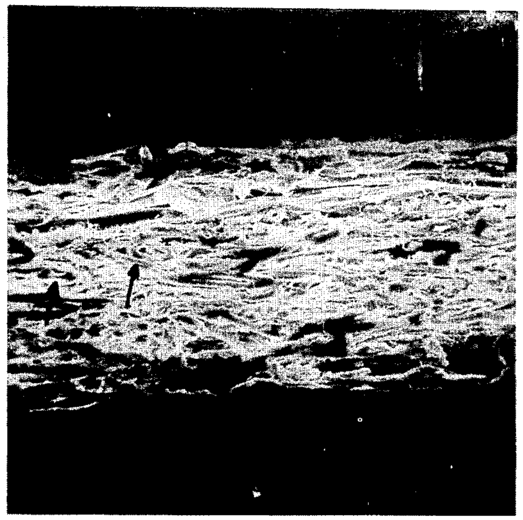
Figure 10:
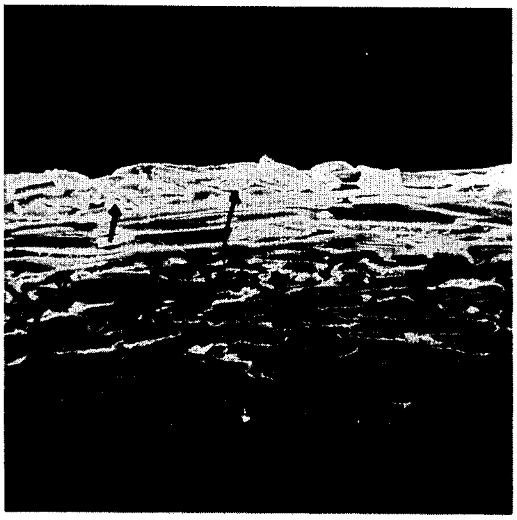
Figure 11:

FIG. 9 discloses a micrograph of a medium surface-treated on one side with the resinous material;

FIG. 10 discloses a micrograph of linerboard surface-treated on one side with the resinous material; and FIG. 11 discloses an enlargement view of that portion of the micrograph in FIG. 10 indicated by the longer-tailed arrow.

Figure 1:
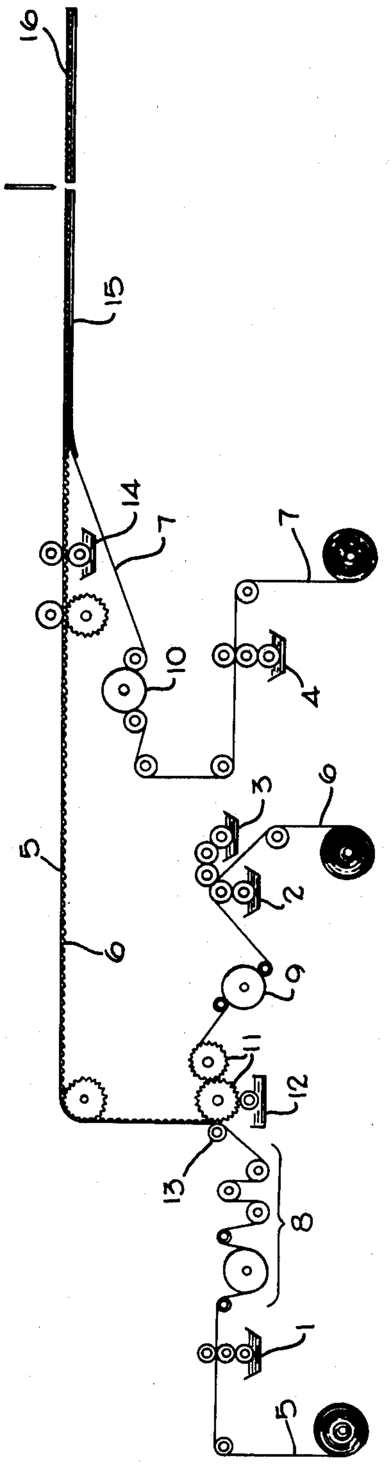
FIG. 1 is, at once, a schematic view of an apparatus suitable for, and a flow sheet illustrating the sequence of steps in, the manufacture of the rigid-when-wet corrugated container-board as an adjunct to a conventional corrugating machine.
Figure 6:
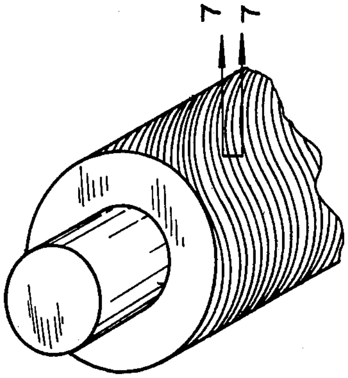
FIG. 6 is a perspective view of a portion of gravure roll of the "tri-helicoid" type.
Figure 7:
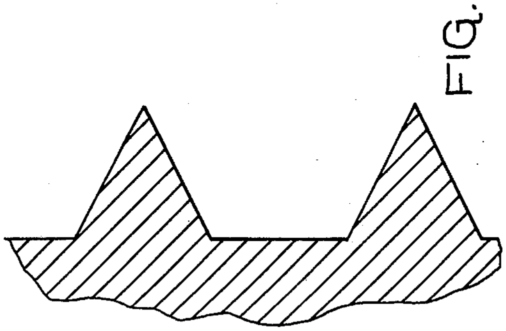
FIG. 7 is a sectional view taken along line 7—7 of FIG. 6 on enlarged (approximately 50 times) scale.

Referring now to FIG. 1 for an illustrative embodiment of the apparatus for carrying out the process of the invention as an adjunct to a conventional corrugating machine, there is provided a plurality of resin applicators 1, 2, 3 and 4, which are disposed, respectively, for application to the reverse face of a liner web 7. The reverse face is usually the wire-side of the paper, but, in any event, is that face of a liner which will be concealed in the finished product. The applicators 1, 2, 3 and 4 preferably include a gravure roll of the type known in the art as "tri-helic id" and shown in FIG. 6, or the type known as "quad". However, the cells in the gravure rolls for applicators 2 and 3 are preferably of magnitude such as to transfer to any one side of the medium web only about half the quantity of resin as that applied to a single side of the respective liner webs by applicators 1 and 4.

Immediately adjacent the respective applicators, there is provided a heater roll, or series thereof, 8 for the web 5, 9 for the web 6, and 10 for the web 7. The temperature of the respective heaters 8, 9 and 10 is controlled in coordination with the duration of surface contact of the several webs with their respective heaters, so as to: (a) avoid substantial curing of the applied thermosetting resin; and (b) remove at least that amount of water which was introduced with the resin solution, and as much other paper-entrained water as is desirable for best operation of the particular corrugating machine, which is usually in the range of 7 to 9% by weight of the web prior to being surface-treated. In effect, the heaters 8, 9 and 10 are controlled to remove from the webs 5, 6 and 7, respectively, that amount of water which was added to the web by the immediately preceding resin applicator or applicators, as the case may be. Typically, with a resinous composition of the type described in I above, the temperature of the heaters 8, 9 and 10 may be maintained at 350° F. with contact duration of 0.5–2.0 seconds. The duration of the contact may be shortened by increasing the speed at which the web moves or by decreasing the arcuate length of the "wrap" of the web about a heater roll, or by a combination of the two variables. Conversely, the duration of contact may be decreased by decreasing the speed and/or increasing the "wrap".

Between heater 8 and heater 9, there is provided the conventional apparatus 11 for corrugating the medium web 6, as well as an applicator 12 for applying adhesive to the exposed crowns of the just-formed corrugations in web 6 in accordance with the usual practice in the manufacture of corrugated paper-board, where a backup roller, such as 13, is employed for pressing the liner web 5, (commonly called the "single face liner") against the exposed crowns of corrugated medium 6 before the latter has departed engagement with one of the corrugating rolls 11.

Another adhesive applicator 14 is provided for applying adhesive to those crowns of the corrugated medium 6 which were addressed away from applicator 12 when the medium traversed it.

Figure 2:
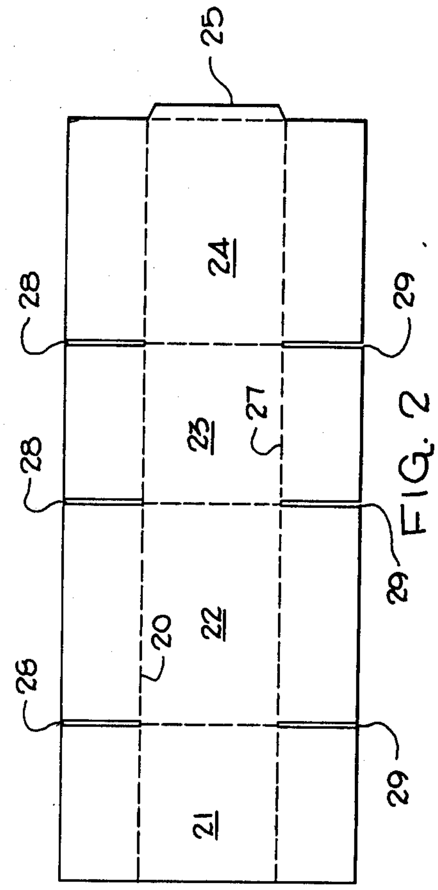
FIG. 2 is a plan view of a double-slotted container blank of a type which may be cut off, slotted, and scored, in the concluding operation of the apparatus shown schematically in FIG. 1.

As is conventional with corrugating means of the type schematically illustrated, the liner web 7 (commonly called the "double-backer"), after leaving the heater 10, is directed in converging relationship with the previously united single face liner 5 and corrugating medium 6 at a position immediately beyond the adhesive applicator 14. In the apparatus schematically illustrated in the drawing, such convergence occurs on table 15, which may, if desired, be equipped with any suitable backup means for biasing the united liner 5 and medium 6 toward the liner 7 with force less than sufficient to collapse the corrugations in medium 6. At some suitable location on table 15 or elsewhere, the composite container-board, consisting of the united components 5, 6 and 7, is operated upon by appropriate apparatus for cutting off, scoring, slotting, and/or slitting, the continuous composite web to produce container blanks 16, such as that shown in FIG. 2, which is for a so-called "Regular Slotted Container", wherein the blank consists of end panels 21 and 23 with side panel 22 intervening and side panel 24 therebeyond having a so-called "manufacturer's joint" flap 25. Each of the panels 21–24 has an adjoining top and bottom flap delineated by longitudinal score lines 26 and 27 respectively, and by the intervening transverse slots 28 and 29 respectively.

Figure 3:
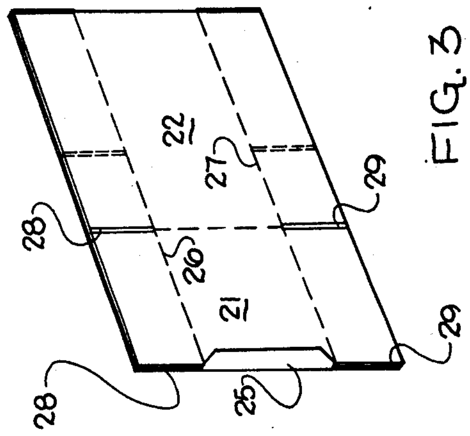
FIG. 3 is a perspective view of the blank shown in FIG. 2 in flat folded or knocked-down condition, after its manufacturer's joint has been completed.
Figure 4:
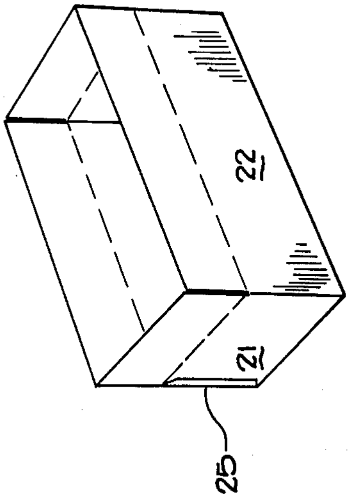
FIG. 4 is a perspective view of a shipping container which results from setting up and closing the bottom flaps of the flat folded blank shown in FIG. 3.

Blanks such as 16 may be accumulated and stored under ambient conditions indefinitely, or they may be immediately converted into "flat folded" or "knocked-down" containers by completing the manufacturer's joint which involves securing, as by adhesive or stitching, the manufacturer's joint flap to the remote edge of end panel 21, so as to produce the flat folded structure shown in FIG. 3, which is the knocked-down container, or the flat folded structure may be folded into a shipping container, as shown in FIG. 4.

Figure 5:
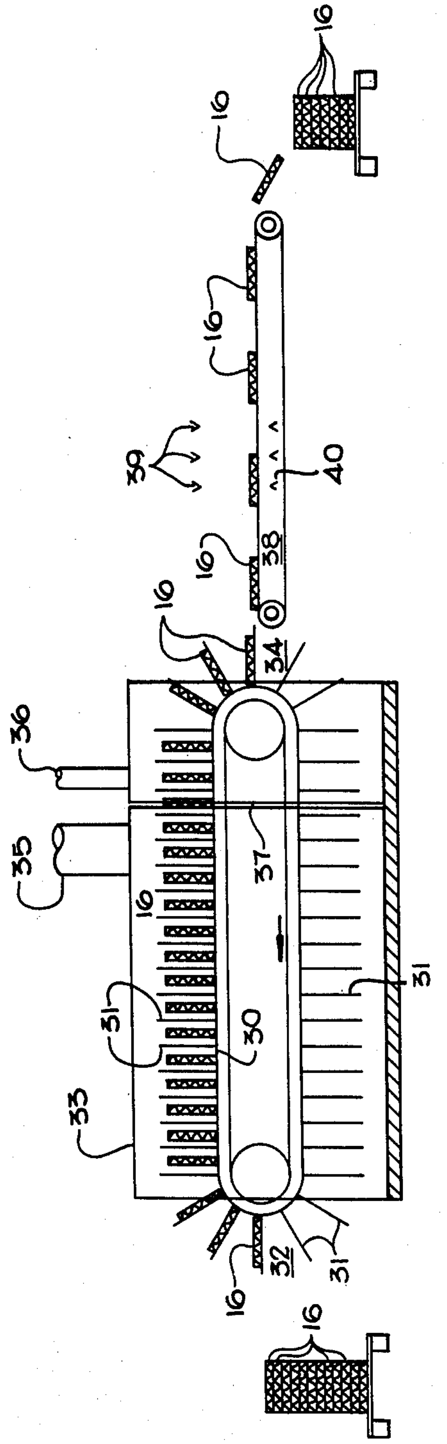
FIG. 5 is a schematic view of apparatus appropriate for curing the thermosetting resin deposited on and in the components of container blanks of the character shown in FIGS. 2 or 3, and thereafter quenching them.

Either before or after the manufacturer's joint is completed as just described (or, at any rate, prior to the time the container is packed), the blank or the knocked-down container is subjected to any appropriate operation for curing the resin with which the components of the corrugated board were surface-treated. An appropriate curing facility is illustrated in FIG. 5, which diagrammatically illustrates a tunnel oven comprising an endless conveyor 30, having a multiplicity of wicket-like flights 31 projecting outwardly therefrom. The endless conveyor is driven in the direction shown by the arrows in FIG. 5. An accumulation of blanks such as 16, or, alternatively, an accumulation of the knocked-down containers as shown in FIG. 3, is moved into convenient proximity with the input end 32 of the conveyor 30, and one by one the respective blanks are placed upon a passing flight 31 and transported thereon through the tunnel 33 to the discharge end 34 of the conveyor. While the blanks are being transported on the conveyor, the tunnel enclosing the latter is supplied with a continuous draft of hot air through duct 35. The temperature of the air is so coordinated with the speed of the conveyor 30 that the respective blanks (or knocked-down containers) being transported by the conveyor are elevated to the temperature sufficient to cure the resin previously applied to the inside surfaces of the liners 5 and 7, and to both surfaces of the medium 6, and which has been reposing thereon and therein in uncured condition. An appropriate curing temperature for the phenolic resins hereinbefore described is 375° F. for a period of eight minutes, but higher or lower tempratures may be employed with appropriate adjustment of the duration of the exposure of the blanks to that temperatures, in accordance with the empirical rule that for every 18° F. of temperature above (or below) the median of 375° F., the duration of the treatment is decreased (or increased) by fifty percent. Preferably, the blanks or knock-down containers undergoing curing are maintained at the curing temperature for the requisite period of time during the middle two-fourths of their movement on conveyor 30, so that in the final fourth of such movement, they may, if desired, be exposed to a draft of cooling air supplied through duct 36 which reduces their temperature to, at most, about 210° F. by the time they reach the discharge and 34 of conveyor 30. The drafts of hot and cold air are preferably separated by an air curtain emerging from an elongated nozzle 37.

From the discharge end of conveyor 30, the blanks and/or knocked-down containers are deposited upon a reticulated conveyor 38 which transports them, in spaced relationship with each other, under a spray of water emerging from spray heads 39 above the conveyor, and over a spray of water forcibly emerging upwardly from spray heads 40 located below the upper reach of the conveyor 38. At the discharge end of conveyor 38, the wet blanks 16 are stacked and aged for a period of at least four hours under ambient conditions. Thereafter, if the manufacturer's joint has not theretofore been completed, the same may be done at any convenient time and place. Either the blanks or the knocked-down containers are then ready for shipment to the packer, where they are set up, packed and thereafter subjected to hydro-cooling, or other appropriate refrigeration prior to, and/or during, shipment.

To demonstrate the nature and extent of the phenolic's distribution within the substance of liner-board surface-treated in accordance with the invention on one face only and cured, versus that of medium-board surface-treated on both sides, and cured, scanning electron-micrographs of thickness cross-sections of each, are informative. FIG. 9 shows a thickness cross-section of medium surface-treated on both sides with the resin-catalyst-water composition described under I hereinbefore, and cured without being corrugated or combined with liner. It shows that surface treated on both sides results in three significant factors: (i) that the resin (the highlights) has penetrated all the way through the thickness dimension of the medium; (ii) that there is less concentration of the resin adjacent the surfaces than in the intermediate zone; and (iii) that the resin perimetrically encases the handles of cellulose fibers, but does not fill the familiar canal within them. Note the annuli with central black spots, some of which are indicated by arrows. Such an annulus is a bundle of cellulose fibers, the highlighted ring around it is a sheath of resin, and the black spots are the canals within then which are substantially devoid of resin.

In contrast with (i) and (ii) of the micrograph shown in FIG. 9, the micrograph in FIG. 10 shows a thickness cross-section of liner-board surface-treated, on one side only with an amount of resin equal to the sum of that applied to each side of the medium-board and cured, it reveals three significant factors: (iv) that the greatest concentration of resin (highlights) is adjacent the surface at which it was applied; (v) that a substantial increment of the thickness adjacent the surface opposite that to which resin was applied is almost completely devoid of resin; and (vi) like the micrograph of FIG. 9, that the resin perimetrically encases the bundles of cellulose fibers, but does not fill the familiar canal within then. Note the annuli with central black spots indicated by the arrows.

For more detailed scrutiny of one of the annuli, as well as the micro structure surrounding it, reference may be had to the micrograph of FIG. 11, which is an enlargement of the area about the annulus indicated by the longer-tailed arrow in micrograph II, which show not only the open canal in, but a resin deposit on the upper side thereof, as well as the sheath of resin encasing, the bundle of fibers seen in cross-section. It also shows numerous other bundles of fibers (some cracked, probably from the sectioning operation) with prominent highlights indicative of the resinous sheath about the fiber bundles, and also the bonding together, by the resin, of random oriented fiber bundles.

While it has not yet been ascertained with certainty what particular chemical or physical phenomenon causes the phenolic resin to have a preferential affinity for attaching itself to the exterior increments of the fiber bundles rather than filling the canal within the bundles, several possible theories present themselves, to wit: the resin molecule is too large to enter the canal; the cellulose fibers are more readily wet by the water-catalyst solution (in the surface-treating mixture) than by the resin, with the result that the water (with some of the catalyst dissolved therein) is quickly absorbed by the fiber bundles, thereby deserting the larger molecules of resin which are more or less filtered out and deposited as a sheath about the perimetrical increments of fiber bundles where the uncured resin in the sheath is catalyzed from the inside, out, as well as from the outside, in. Regardless of which, if any, of the theories may prove correct, the fact that a sheath of resin circumscribes the fiber bundles, substantially adds to the strength of those bundles, and, together with the cross bonds formed by the resin between different bundles of fibers, clearly provides strength sufficient to enable a paperboard box to maintain its shape and substantial strength after the cellulose fibers have become limp from prolonged presence in water. Moreover, the degree of brittleness which has heretofore militated against the success of resin-treated paperboard in containers (hopefully intended for use under wet conditions) is reduced to insignificance by the fact that, while the resinous sheath about the fiber bundles (as well as the peripheral increments of such bundles which are penetrated by the resin) may fracture during scoring and folding (which is where the objectionable brittleness has heretofore manifested itself), most of the cellulose fibers are not penetrated by the resin, and hence remain sufficient flexible to hold the fiber lattice intact under scoring and folding conditions.

As typifying the Wet/Dry Strength Retention Factors obtainable with Regular Slotted Containers (10 inches × 12 inches × 10inches) and Half Slotted Containers (16 inches × 12 inches × 12inches) made of corrugated paperboard treated in accordance with this invention, in contrast with board not, or only partially, so treated, the following test results are significant:

TABLE II

| TABLE I Components Combination | Component T.A.I. | Dry (Tappi 402) | After 24 Hours Under Water | Wet/ Dry S.R.F. |
|---|---|---|---|---|
| 4-7-4 | None | 645# | Zero | |
| 4-7-4 | Medium only | 675# | 150# | 22% |
| 4-7-4 | Liners & Medium | 817# | 274# | 33% |
| 3-6-3 | Liners & Medium | 1344# | 460# | 34% |
| 1-5-1 | Liners & Medium | 2688# | 805# | 30% |

In Table II, and the Tables to follow: "T.A.I." means treated according to this invention, i.e., liners surface treated with phenolic resin on the concealed side only, medium so surface treated on both sides, combined (by the above-described resorcinol-starch adhesive), and cured; "S.R.F" means Strength Retention Factor; and "#" means pounds.

As typifying the results obtainable from corrugated container-board, in some of which the paperboard components were, and some not treated in accordance with the present invention, the test results of Tables III and IV are cited:

TABLE III

FLAT CRUSH (Tappi '08-03-65) OF CORRUGATED CONTAINER-BOARD

| TABLE I Components Combination | Components T.A.I. | Dry (Tappi 402) | After 24 Hours Under Water | Wet/ Dry S.R.F. |
|---|---|---|---|---|
| 2-5-2 | None | 45 p.s.i. | Zero | |
| 2-5-2 | Liners & Medium | 63 p.s.i. | 34 p.s.i. | 54% |
| 1-5-1 | None | 74 p.s.i. | Zero | |
| 1-5-1 | Liners & Medium | 72 p.s.i. | 32 p.s.i. | 44% |
| 2-6-2 | Liners & Medium | 29 p.s.i. | 9 p.s.i. | 31% |
| 3-6-3 | Liners & Medium | 29 p.s.i. | 9 p.s.i. | 31% |

TABLE IV

COLUMN CRUSH (Article Entitled "Compression Strength Formula for Corrugated Board" August 1963 issue of "Paperboard Packaging" Published by Board Products Publishing Co., Chicago) OF CORRUGATED CONTAINER-BOARD

| TABLE I Components Combination | Components T.A.I. | Dry (Tappi 402) | After 24 Hours Under Water | Wet/ Dry S.R.F. |
|---|---|---|---|---|
| 2-5-2 | None | 68 p.i.w. | Zero | |
| 2-5-2 | Liners & Medium | 71 p.i.w. | 28 p.i.w. | 39% |
| 1-5-1 | None | 74 p.i.w. | 6 p.i.w. | 8% |
| 1-5-1 | Liners & Medium | 81 p.i.w. | 25 p.i.w. | 31% |

In Table IV, "p.i.w." means pounds per inch of width of the specimen tested. Neither embrittlement of objectionable degree nor delamination occurred with specimens subjected to the tests reported in Tables II, III or IV.

Wet/Dry Strength Retention Factors as high as 30% have not, to our knowledge, been heretofore attainable with the consistency required for industrial production, or without objectionable embrittlement or delamination, from combined corrugated board (or boxes made therefrom) which has been under water for 24 hours. The Wet/Dry Strength Retention Factor suffers severe diminution upon delamination of the combined board, and hence that Factor is to be construed herein as implying that lamination is maintained throughout the period of under-water preconditioning for, and during, tests. However, the Strength Retention Factor only partially relates the significance of the rigid-when-wet characteristics achieved by this invention. A further important characteristic of container-board made in accordance with this invention, and of containers fabricated therefrom, is the longevity of the rigid-when-wet strength without delamination as illustrated by the graphs in FIG. 8, which depict, comparatively, the change in Wet/Dry Strength Retention Factor over much longer periods of under-water pre-conditioning for test. In the comparative tests, whose results are reflected in FIG. 8, three series of corrugated paperboard containers were involved, to wit: (i) fabricated from corrugated board whose paperboard components (1-5-1) were surface-treated, combined and cured in accordance with this invention, and whose characteristics are plotted by the solid black line; (ii) fabricated from standard commercial corrugated container-board, whose Wet Strength paperboard components (1-5-1) were the same as those in (i), but without treatment in accordance with the present invention, and whose characteristics are plotted by the circular dots in FIG. 8; and (iii) fabricated as in (ii), but subsequently impregnaed with wax in the manner which, insofar as we are informed, has heretofore been considered to be the most industrially acceptable to produce boxes having characteristics which approach those of boxes made in accordance with the present invention.

Figure 8:
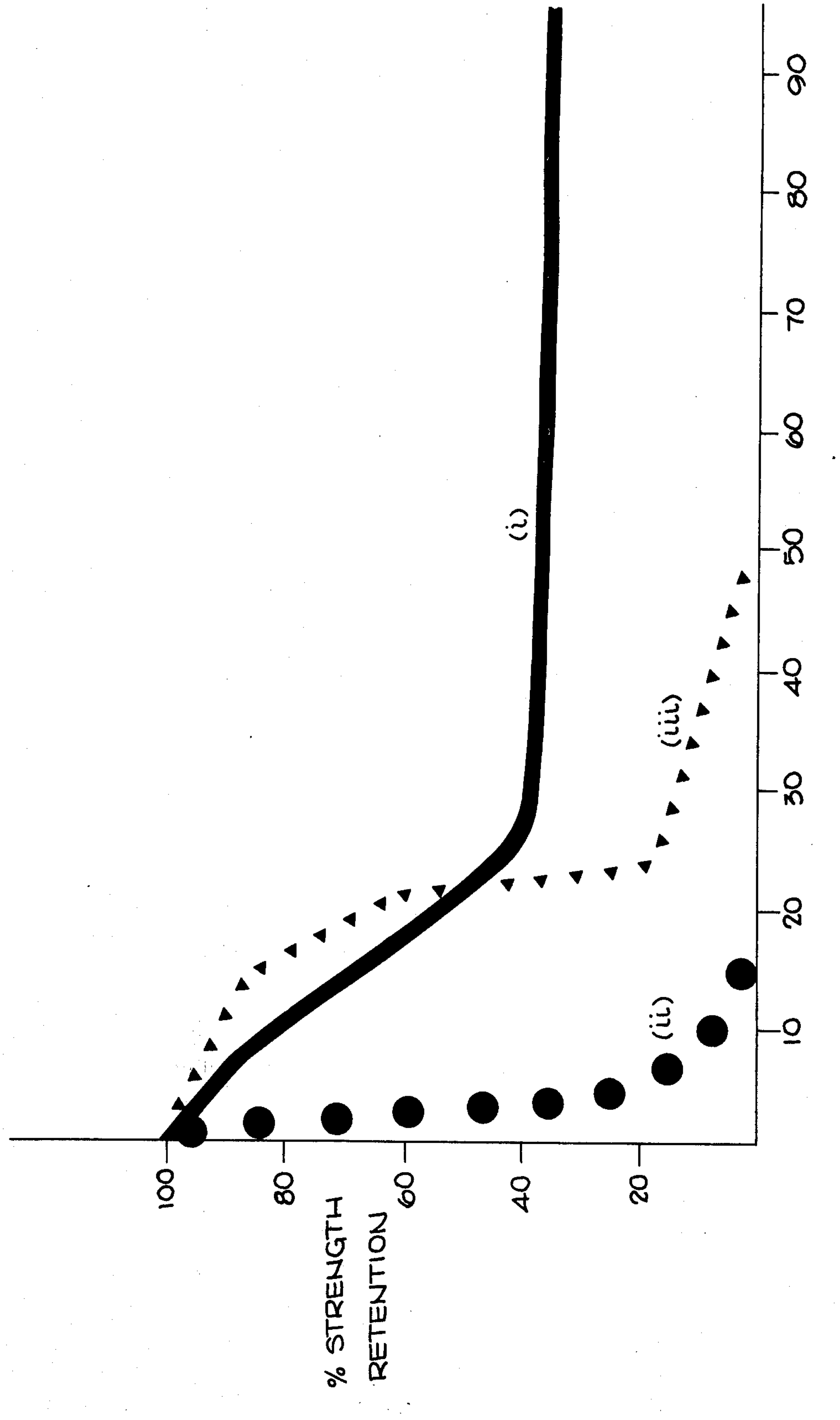
FIG. 8 is a set of graphs illustrating the degree and longevity of strength retention under water with boxes made in accordance with the present invention in comparison with those of the prior art.

It will be apparent from FIG. 8 that the Wet/Dry Strength Retention Factor of boxes made per (ii) above bottoms cut to zero after approximately 15 hours under water; that the Wet/Dry Strength Retention Factor of boxes made per (iii) above declines to 30% to 23 hours, and bottoms cut to zero after approximately 48 hours, under water; but in contrast, boxes made in accordance with this invention maintain their Wet/Dry Strength Retention Factor well above 30% after more than 90 hours under water, e.g., 35% at 96 hours without delamination. The underwater period required for boxes made in accordance with the present invention to bottom out at zero Wet/Dry Strength Retention Factor or to delaminate has not yet been ascertained, but in any event, boxes which maintain a Wet/Dry Strength Factor of at least about 30% for a period of 24–30 hours under water without delamination are usually adequate for the primary purpose of the invention, namely, the intranational shipping of fresh comestibles from source to market under wet conditions.

While the invention has been described with particular reference to corrugated paperboard containers, it is also applicable to other types of laminated paperboard, such as the so-called "solid fiber" container-board, in the manufacture of which three or more plies of paperboard, comparable with the liners and (uncorrugated) medium of corrugated container-board are laminated together, and can be surface-treated, as hereinbefore described, with phenolic resin on the concealed side of each outside ply, and/or on both sides of at least one of the intervening ply or plies.

From the foregoing description, those skilled in the art will readily understand that the invention achieves its objects, and provides paperboard components for combination with each other to produce laminated paperboard, and containers made therefrom, which are readily wettable and substantially water-absorptive, but maintain a sufficient percentage of their dry strength to enable them to be packed, handled, and shipped for long distances, or stored for long periods of time, under wet conditions, while laden and stacked one upon the other.

Having thus described the invention, what is claimed and desired to be secured by Letters Patent is:

1. In the art of manufacturing rigid-when-wet corrugated-board from a preformed web of medium and at least one performed web of liner, each of which has an obverse face and reverse face, the process comprising, surface-treating the reverse face of the liner web by printing thereon a controlled amount of a mixture composed with a curable thermosetting resinous material entrained in a vaporizable liquid vehicle without effecting the moisture absorbency of said obverse face, the thermosetting resinous material comprising about 35 to 65 percent by weight of the mixture when entrained in the vaporizable liquid vehicle, and immediately vaporizing at least a substantial part of the vehicle from the web by heating at a temperature and for a time less than that required to substantially advance the cure of the resinous material therein.

2. The process of claim 1 in which the resinous material is water miscible, and the vehicle is aqueous.

3. The process of claim 1 in which said mixture is liquid and has a viscosity of about 18 ± 0.5 seconds in a #2 Zahn cup at 88° F.

4. The process of claim 1 including the step of printing discretely metered increments of said mixture of the thermosetting resinous material in said liquid vehicle in minutely spaced relationship.

5. The process of claim 1 wherein the quantity of resinous material applied to the reverse face of the liner web includes about 3.3 to 3.9 pounds per thousand square feet of liner.

* * * * *